INVENTORS.
ALEXANDER BACZEWSKI
DONATO J. BRACCO

United States Patent Office 3,440,471
Patented Apr. 22, 1969

3,440,471
ELECTROLUMINESCENT CELL MATRIX
MATERIAL OF IMPROVED STABILITY
Alexander Baczewski, Kew Gardens, and Donato J. Bracco, Great Neck, N.Y., assignors to General Telephone and Electronics Laboratories, Inc., a corporation of Delaware
Filed Mar. 16, 1966, Ser. No. 534,689
Int. Cl. H01j 1/62
U.S. Cl. 313—108　　　　　　　　　　　　　8 Claims

ABSTRACT OF THE DISCLOSURE

A matrix for use in electroluminescent lamps which comprises a layer of an organic non-vitreous medium, such as cyanoethylcellulose, having electroluminescent phosphor particles of the zinc sulfide type suspended therein. An organic zinc salt, such as zinc acetylacetonate or zinc dithio carbamate, is dispersed within the dielectric medium.

---

Figure 1:
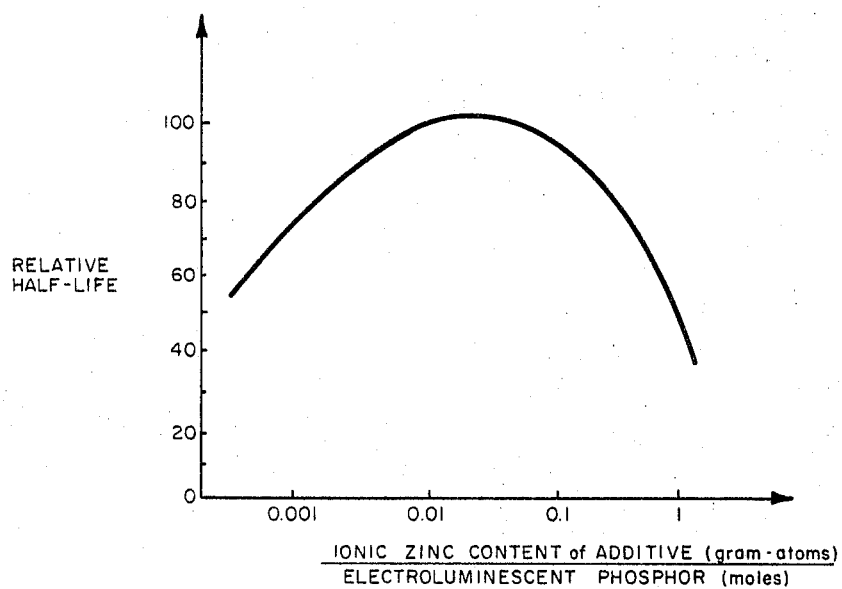

This invention relates to electroluminescent cells having a light output of improved stability and to methods for producing same. The invention relates also to non-vitreous electroluminescent matrices for use therein.

An electroluminescent lamp normally comprises an electroluminescent matrix consisting of a multiplicity of electroluminescent phosphor particles dispersed in a dielectric, and first and second electrodes secured to opposite surfaces of the electroluminescent matrix. At least one of these electrodes permits the passage of light therethrough. When a voltage is applied between the electrodes, light is emitted from the matrix.

One type of phosphor, known as the zinc sulfide type of electroluminescent phosphor, includes together with suitable activators and coactivators, those phosphors wherein cadmium can be substituted for an equivalent mole percent of zinc and wherein selenium can be substituted for an equivalent mole percent of sulfur. The activated phosphor, in the form of finely divided particles, is dispersed in the dielectric medium.

The dielectric media employed in electroluminescent lamps may be categorized as either vitreous or non-vitreous. The vitreous dielectric media, normally glass frit, is found useful in applications wherein a non-flexible cell is desired. In addition, the dispersion of the phosphor particles in a vitreous dielectric having a softening point in the temperature range of 600 to 700° F. was found to improve the stability of the level of light produced by the cell. In practice, electroluminescent cells having this type of dielectric exhibit a relatively low rate of decline in emitted light as compared with the rate of decline for cells having non-vitreous dielectrics. However, this benefit of improved stability was generally found to be more than offset by the loss in intrinsic brightness, often as much as 75%, occurring after the firing of the glass frit.

As a result, stability of the level of light emission from electroluminescent cells was obtained at the expense of intrinsic brightness and flexibility. The present invention is directed to an electroluminescent matrix that employs a non-vitreous dielectric medium wherein stability is improved and the intrinsic brightness of the phosphor is maintained.

In addition, electroluminescent matrices employing a non-vitreous dielectric medium have been found to deteriorate in moist air when subjected to ultraviolet radiation. This deterioration is similar to that occurring when the matrix is operated in an electroluminescent lamp and is evidenced by a gradual darkening of the body color of the matrix.

Accordingly, it is an object of the present invention to provide a non-vitreous electroluminescent matrix having a light output of improved stability.

A further object is to provide a non-vitreous electroluminescent matrix in which the blackening of the body color is substantially eliminated.

Another object is to provide an electroluminescent matrix in which the intrinsic brightness of the phosphor is preserved and the duration of useful light output is substantially increased.

Still another object is to provide a flexible electroluminescent cell having improved stability.

Still another object is to provide a method of making non-vitreous electroluminescent matrices.

These and other objects are provided by adding an organic zinc salt to the mixture of the electroluminescent phosphor particles and the nonvitreous dielectric medium. The zinc salt is dispersed within the mixture in such proportion that the ionic zinc content of the salt resides within the approximate range of 0.001 to 0.1 gram-atom per mole of phosphor.

The electroluminescent phosphor is of the zinc sulfide type in which portions of the zinc and the sulfur may be replaced by equivalent mole percents of cadmium and selenium respectively. These phosphors are characterized by an anion which when combined with zinc forms an electroluminescent phosphor. This type of phosphor is activated by the addition of small amounts of copper, manganese, chlorine or the like. A method of preparing zinc sulfide type phosphors is described in Patent No. 2,957,830, to P. Goldberg et al.

The electroluminescent phosphor is finely divided and dispersed in a liquified non-vitreous dielectric medium. The non-vitreous dielectric medium is an organic material, such as cyanoethylcellulose, polystyrene, and the like, to which an additional resin may be added to improve the binding properties. Typically, the medium is dissolved in a solvent such as toluene. The electroluminescent particles are then added and the resulting mixture is stirred so that the phosphor particles are uniformly dispersed. To this dispersion, an organic zinc salt, for example zinc octoate, is added either at full strength or diluted with a solvent. In either case, the amount of salt added is such that the ionic zinc content of the additive resides within the approximate range of 0.001 to 0.1 gram-atom per mole of phosphor.

Since the zinc salt is added to an organic solution of the dielectric medium and its solvent, the particular organic salt employed should be oil soluble as opposed to water soluble so that it forms a clear dispersion in the dielectric medium. While certain organic salts possess both oil and water solubility, the fatty acids forming the group between heptoic and dodecanoic acids inclusive are primarily oil soluble and well-adapted for forming the zinc salt.

The matrix comprising the organic dielectric, the phosphor particles, and the zinc salt additive, is found to improve the stability of electroluminescent cells having a non-vitreous dielectric without degrading the intrinsic brightness of the phosphor. This result is believed to be obtained by the action of the ionic zinc present in the additive which represses the water solubility of the phosphor by common ion effect. The solubility of the phosphor material in water results in the ionization of the zinc and the subsequent deterioration of the phosphor. Since water vapor is present during the preparation of the phosphor and in the normal operating environment coupled with the fact that the dielectric materials are pervious thereto, a sufficient quantity of water to ionize significant amounts of phosphor is available. It has been postulated that zinc sulfide type electroluminescent phosphors decompose under excitation and in the presence of ultraviolet radiation with the reduction and oxidation of the cation and anion resulting in the formation of elemental zinc and sulfur. By providing a source of ionic zinc other than that supplied by the decomposition of the phosphor, the water solubility of the phosphor cation by common ion effect is decreased and deterioration of the phosphor substantially reduced. The internal mechanism of electroluminescence deterioration is believed due to either the migration of ionic zinc from the phosphor particles to the surface of the matrix thereby destroying the lattice structure in regions exhibiting electroluminescence or the rearrangement of the activator and/or co-activator atoms within the lattice due to the migration of the zinc ions. By decreasing the solubility of the ionic zinc of the phosphor in the matrix, this migration and the resulting deterioration of the phosphor is reduced.

In the case of deterioration of the matrix due to ultra-violet radiation, the electrons necessary for the reduction of the zinc are believed to be made available by the incident photons rather than liberated by the high field regions incidental to the electroluminescent mechanism. The elemental zinc is formed at the matrix surface with any moisture present acting as a solvent to increase the supply of zinc at the surface. The additive, by reducing the solubility of the zinc sulfide by common ion effect, provides a protective action in that it inhibits the decomposition of the phosphor by the aforedescribed mechanism so that the intrinsic brightness of the electroluminescent matrix is substantially maintained.

Figure 2:
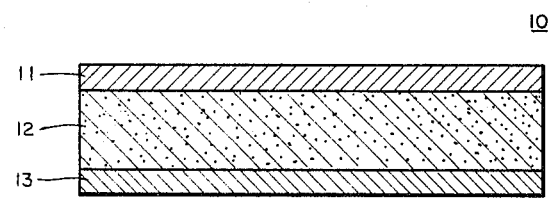

Further features and advantages will become more readily apparent from the following detailed description taken in conjunction with the accompanying drawings in which FIG. 1 is a curve showing the variation in the relative half-life of electroluminescent cells with the percent of ionic zinc per mole of electroluminescent phosphor, and FIG. 2 shows an electroluminescent cell formed in accordance with the invention.

In the present invention, a zinc sulfide type electroluminescent phosphor is activated and prepared in a conventional manner, for example as described in the aforementioned Patent 2,957,830. The phosphor consists of a multiplicity of finely divided activated particles. The type of phosphor referred to herein as a zinc-sulfide type is characterized by an anion which when combined with zinc forms an electroluminescent phosphor.

The phosphor particles are added to a non-vitreous dielectric medium when it is in a liquid form.

While the following list is not intended to be exclusive, it contains examples of non-vitreous dielectric media and the corresponding solvent suitable for use in the present invention Medium:   Solvent
   Polyacrylates _____ Toluene or butylacetate.
   Polymethacrylates _____ Toluene or butylacetate.
   Polyvinyl chlorideacetate__ Methylisobutylketone.
   Cyanoethylcellulose _____ Tetrahydrofurane.
   Polystyrene _____ Toluene.
   Epoxy-resins _____ Solvent-free.

The mixture is then stirred to insure that the phosphor particles are substantially uniformly dispersed. While the mixture is still in a liquid state, an oil soluble organic zinc salt is added in such proportion that the ionic zinc content of the additive resides within the approximate range of 0.001 to 0.1 gram-atom per mole of phosphor. The zinc salt may be added either at full strength or diluted with a solvent, such as toluene.

Organic zinc salts found especially well suited for use in the present invention are zinc acetylacetonate, zinc dithio carbamate, and the zinc salts of a saturated fatty acid selected from the group of acids between heptoic acid and dodecanoic acid, inclusive. However, other zinc salts having an organic radical may be employed provided that they form a clear dispersion, i.e., a dispersion that is essentially not visible in ordinary light, in the organic dielectric medium. The use of water soluble, rather than oil soluble, zinc salts is found to provide a cloudy matrix with the result that the light output of the matrix is decreased. Generally, the cloudy effect is due to the fact that after the evaporation of the solvent the additive forms crystals which obscure a portion of the light emitted by the phosphor particles.

The following examples of the electroluminescent phosphor, dielectric medium, and additive ingredients are suitable for use in accordance with the invention. Initially, a lacquer is prepared by dissolving 30 parts by weight of polystyrene resin (Type KTPL produced by Koppers Co.) in 70 parts by weight of toluene, solvent grade. To 83 parts by weight of this solution, 17 parts by weight of resin (Type 276V2 produced by Dow Chemical Co.) are added. Next 52.8 parts by weight of copper-activated zinc sulfide are added to 47.2 parts by weight of the lacquer. The mixture is stirred for about 25 minutes. At the end of this period zinc octoate is added at full strength such that the ionic zinc content of the additive resides within the approximate range of 0.001 to 0.1 gram-atom per mole of electroluminescent phosphor. The matrix is then dried to solid form by the evaporation of the solvent.

The curve of FIG. 1 illustrates the improved stability of electroluminescent matrices having a polystyrene dielectric medium and prepared as set forth above by showing the relation between the ionic zinc content of the additive per mole of electroluminescent phosphor and the relative half-life of the matrix when excited by an electric field. The relative half-life is calculated relative to the half-life of the matrix containing 0.01 gram-atom of ionic zinc per mole of zinc sulfide which is shown as 100 in FIG. 1. The half-life for each matrix was calculated from the following expression after an excitation of 198 minutes by an applied voltage of 400 v. at a frequency of 1K c.p.s.

$$B = \frac{Bo}{1+\dfrac{t}{tc}}$$

where $Bo$ is the initial brightness of the matrix, $B$ is the final brightness of the matrix, $t$ is the time under excitation and $tc$ is the half-life or time required to decline to half of the initial brightness. The matrices were contained in a humidity chamber having a saturated atmosphere at 25° C. to accelerate aging. Although not shown in FIG. 1, due to the nature of the abscissa, a control matrix, having no zinc additive was found to have a relative half-life of 32. This indicates a three-fold improvement in relative half-life for an electroluminescent matrix having an ionic zinc content of 0.01 per mole of zinc sulfide.

The matrices were tested by forming a series of electroluminescent lamps, of the type shown in FIG. 2, wherein lamp 10 comprises first and second electrodes 11 and 13 respectively formed on opposing surfaces of matrix 12. First electrode 11 is formed by the vacuum deposition of aluminum on the top surface of matrix 12. Second electrode 13 is glass having a transparent conductive coating of tin oxide thereon adjacent matrix 12. The application of a voltage between electrodes 11 and 13 results in the emission of light by matrix 12.

Further, the addition of the organic zinc salt is found to decrease the darkening of the matrix on exposure to ultraviolet radiation. This is shown by the following table comparing the reflectance of three electroluminescent matrices prepared as previously described before and after exposure to the ultraviolet radiation provided by a germicidal lamp having an overall power consumption of 18 inches from the matrices.

| Sample | Exposure time (minutes) | Reflectance |
|---|---|---|
| A | 0 | 65.4 |
| B | 0 | 66.2 |
| C | 0 | 67.6 |
| A | 40 | 39.6 |
| B | 40 | 48.2 |
| C | 40 | 63.2 | wherein sample A contains no additive, sample B contains zinc acetate which is water soluble rather than oil soluble, with the ionic zinc per mole of phosphor equal to 0.07 gram-atom, and sample C contains zinc octoate with the ionic zinc per mole of phosphor equal to 0.05 gram-atom. It is apparent from the above table that the reflectance of the sample C containing zinc octoate is maintained substantially constant.

While the above description has referred to specific embodiments of the invention, it will be apparent that many modifications and variations may be made therein without departing from the spirit and scope of the invention.

What is claimed is:

1. An electroluminescent matrix which comprises:
   (a) a layer of organic non-vitreous dielectric medium;
   (b) a multiplicity of electroluminescent phosphor particles suspended in said layer, said phosphor consisting essentially of particles from the group consisting of the sulfides and selenides of zinc and cadmium, and
   (c) an organic zinc salt dispersed within said layer in such proportion that the ionic zinc content of said salt resides within the approximate range of 0.001 to 0.1 gram-atom per mole phosphor, said salt forming a clear dispersion in said dielectric medium.

2. The matrix in accordance with claim 1 in which said zinc salt is selected from the group consisting of zinc acetylacetonate and zinc dithio carbamate.

3. The matrix in accordance with claim 1 in which said zinc salt comprises an oil soluble salt of a saturated fatty acid.

4. The matrix in accordance with claim 1 in which said salt comprises zinc octoate.

5. The matrix in accordance with claim 1 in which said phosphor particles consist essentially of zinc sulfide.

6. The method of forming a stabilized electroluminescent matrix which comprises the steps of
   (a) dispersing a multiplicity of electroluminescent phosphor particles in an organic non-vitreous dielectric material, said phosphor consisting essentially of particles from the group consisting of the sulfides and selenides of zinc and cadmium,
   (b) dispersing an organic oil-soluble zinc salt in the dielectric material in such proportion that the ionic zinc content of said salt resides within the approximate range of 0.001 to 0.1 fram-atom per mole of phosphor, and
   (c) drying the mixture to form an electroluminescent matrix.

7. An electroluminescent cell comprising
   (a) a matrix comprising
      (1) a layer of organic non-vitreous dielectric medium,
      (2) a multiplicity of electroluminescent phosphor particles suspended in said layer, said phosphor consisting essentially of particles from the group consisting of the sulfides and selenides of zinc and cadmium,
      (3) an organic zinc salt dispersed within said layer in such proportion that the ionic zinc content of said salt resides within the approximate range of 0.001 to 0.1 gram-atom per mole phosphor, said salt forming a clear dispersion in said dielectric medium, and
   (b) first and second electrodes secured to opposing surfaces of said matrix, at least one of said electrodes being transparent.

8. The electroluminescent cell defined by claim 7 wherein said phosphor particles consist essentially of zinc sulfide.

References Cited
UNITED STATES PATENTS 3,037,938   6/1962   Amans.

TOBIAS E. LEVOW, *Primary Examiner.*

R. D. EDMONDS, *Assistant Examiner.*

U.S. Cl. X.R.

252—301.3, 301.6